US011822832B1

(12) United States Patent
Ochs et al.

(10) Patent No.: US 11,822,832 B1
(45) Date of Patent: Nov. 21, 2023

(54) AUTOMATIC IDENTIFICATION OF PRINT-PROHIBITED REGIONS AND TEMPLATE CREATION

(71) Applicant: XEROX CORPORATION, Norwalk, CT (US)

(72) Inventors: Matthew J. Ochs, Webster, NY (US); Elizabeth L. Barrese, Penfield, NY (US); Dara N. Lubin, Pittsford, NY (US); Ron Edward Dufort, Rochester, NY (US); Elizabeth Crossen, Churchville, NY (US)

(73) Assignee: XEROX CORPORATION, Norwalk, CT (US)

( * ) Notice: Subject to any disclaimer, the term of this patent is extended or adjusted under 35 U.S.C. 154(b) by 0 days.

(21) Appl. No.: 17/846,835

(22) Filed: Jun. 22, 2022

(51) Int. Cl.
*G06F 3/12* (2006.01)
*H04N 1/00* (2006.01)
*G06K 15/00* (2006.01)
*G06K 15/10* (2006.01)

(52) U.S. Cl.
CPC ............ *G06F 3/1208* (2013.01); *G06F 3/125* (2013.01); *G06F 3/1253* (2013.01); *G06K 15/002* (2013.01); *G06K 15/102* (2013.01)

(58) Field of Classification Search
CPC ...... G06F 3/1208; G06F 3/125; G06F 3/1253; G06K 15/002; G06K 15/102
See application file for complete search history.

(56) References Cited

U.S. PATENT DOCUMENTS

| 9,906,654 | B1 | 2/2018 | Taylor et al. | |
| 2014/0232773 | A1* | 8/2014 | Hamazaki | B41J 2/2139 347/14 |
| 2020/0307248 | A1* | 10/2020 | Kurokawa | B41J 11/007 |
| 2021/0303242 | A1* | 9/2021 | Ueda | G06F 3/1292 |

* cited by examiner

*Primary Examiner* — Iriana Cruz
(74) *Attorney, Agent, or Firm* — MH2 Technology Law Group LLP

(57) ABSTRACT

Techniques for operating a digital printer that includes a media transport and an electronic imager disposed in a path of the media transport are presented. The techniques include: receiving an electronic image of a media sheet obtained by the electronic imager; identifying, from the electronic image of the media sheet, a print-prohibited region of the media sheet; generating a mask representing the print-prohibited region of the media sheet; and electronically storing in electronic persistent memory, in association with an identification of a type of the media sheet, a template comprising information regarding the media sheet type, where the template includes an identification of the print-prohibited region represented by the mask.

24 Claims, 7 Drawing Sheets

AUTOMATIC IDENTIFICATION OF PRINT-PROHIBITED REGIONS AND TEMPLATE CREATION

FIELD

This disclosure relates generally to digital printers, such as inkjet printers.

BACKGROUND

Inkjet printers eject liquid ink from printheads to form images on media sheets. Inkjet printers can print in color, and can operate at scales suitable for mass media distributions. For example, large-scale inkjet printer can print hundreds of images per minute, and tens of thousands of images per hour. Example applications of large-scale inkjet printers include consumer catalogs and bulk mailings.

Even with careful manufacturing quality control, individual digital printers, such as individual inkjet printers, can differ from each-other, e.g., in the precise locations of images that they print on media sheets of the same type. Such differences can include printed image locations that differ by as much as a millimeter in any direction within the same type of media sheet.

In general, inkjet printers, and other types of printers, can print on a variety of types of media sheets. However, printing on some types of media, and printing through holes in media, can lead to problems. For example, printing on some types of plastic used for envelope windows can result in undesirable artifacts. As another example, printing through holes in media sheets can result in ink or toner being deposited on media transport surfaces, which fouls the equipment and can transfer the ink or toner to other media sheets.

SUMMARY

According to various embodiments, a system for operating a digital printer is presented. The system includes a media transport; an electronic imager disposed in a path of the media transport; an electronic processor communicatively coupled to an electronic output of the electronic imager; and an electronic persistent memory communicatively coupled to the electronic processor, the electronic persistent memory including instructions that, when executed by the electronic processor, causes the electronic processor to perform actions including: receiving an electronic image of a media sheet obtained by the electronic imager; identifying, from the electronic image of the media sheet, a print-prohibited region of the media sheet; generating a mask representing the print-prohibited region of the media sheet; and electronically storing in electronic persistent memory, in association with an identification of a type of the media sheet, a template including information regarding the media sheet type, where the template includes an identification of the print-prohibited region represented by the mask.

Various optional features of the above embodiments include the following. The actions may further include: providing the template to the printer; executing, by the printer, a print job, where the executing the print job includes printing image content on a media sheet of the type identified by the template; and preventing the printer from printing on a print-prohibited region represented by the mask. The system may further include the digital printer, where a media pathway of the digital printer includes the media transport. The receiving, the identifying, the generating, and the electronically storing may occur prior to a print job of the digital printer; the template may further includes media sheet orientation information; and the actions may further include, during the print job of the digital printer, comparing an electronic image of a media sheet obtained by the electronic imager during the print job to the media sheet orientation information. The actions may further include providing an alert based on the comparing indicating a media sheet misorientation. The digital printer may include an inkjet printer. The media transport may include a duplex media transport, and the template may include identifications of print-prohibited regions on both sides of the media sheet. The generating the mask may include identifying at least one of: a glue region, a media sheet hole, a media sheet void, a glossy region, or a preprinted region. The system may further include a user interface, where the actions further include annotating the mask with an additional print-prohibited region based on user input received at the user interface. The additional print-prohibited region may include a region subject to: a future gloss coat, a future die-cut, a future fold, or a future label application. The mask representing the print-prohibited region may represent the print-prohibited region in an area consisting of less than a process-direction width of the media sheet. The actions may further include, prior to a print job, providing the template to a graphic design process. The template may include print information regarding a particular printer.

According to various embodiments, a method of operating a digital printer including a media transport and an electronic imager disposed in a path of the media transport is presented. The method includes receiving an electronic image of a media sheet obtained by the electronic imager; identifying, from the electronic image of the media sheet, a print-prohibited region of the media sheet; generating a mask representing the print-prohibited region of the media sheet; and electronically storing in electronic persistent memory, in association with an identification of a type of the media sheet, a template including information regarding the media sheet type, where the template includes an identification of the print-prohibited region represented by the mask.

Various optional features of the above embodiments include the following. The method may further include providing the template to the printer; executing, by the printer, a print job, where the executing the print job includes printing image content on a media sheet of the type identified by the template; and preventing the printer from printing on a print-prohibited region represented by the mask. A media pathway of the digital printer may include the media transport. The receiving, the identifying, the generating, and the electronically storing may occur prior to a print job of the digital printer, the template may further include media sheet orientation information, and the method may further include, during the print job of the digital printer, comparing an electronic image of a media sheet obtained by the electronic imager during the print job to the media sheet orientation information. The method may further include providing an alert based on the comparing indicating a media sheet misorientation. The digital printer may include an inkjet printer. The media transport may include a duplex media transport, and the template may include identifications of print-prohibited regions on both sides of the media sheet. The generating the mask may include identifying at least one of: a glue region, a media sheet hole, a media sheet void, a glossy region, or a preprinted region. The method may further include annotating the mask with an additional print-prohibited region based on user input received at a user interface. The additional print-prohibited region may include a regions subject to: a future gloss coat, a future die-cut, a future fold, or a future label application. The mask representing the print-prohibited region may represent the print-prohibited region in an area consisting of less than a process-direction width of the media sheet. The method may further include, prior to a print job, providing the template to a graphic design process. The template may include print information regarding a particular printer.

BRIEF DESCRIPTION OF THE DRAWINGS

Various features of the embodiments can be more fully appreciated, as the same become better understood with reference to the following detailed description of the embodiments when considered in connection with the accompanying figures, in which:

FIG. 2 depicts a media sheet with pre-printed print-prohibited regions and an associated mask according to various embodiments;

DESCRIPTION OF THE EMBODIMENTS

Figure 1:
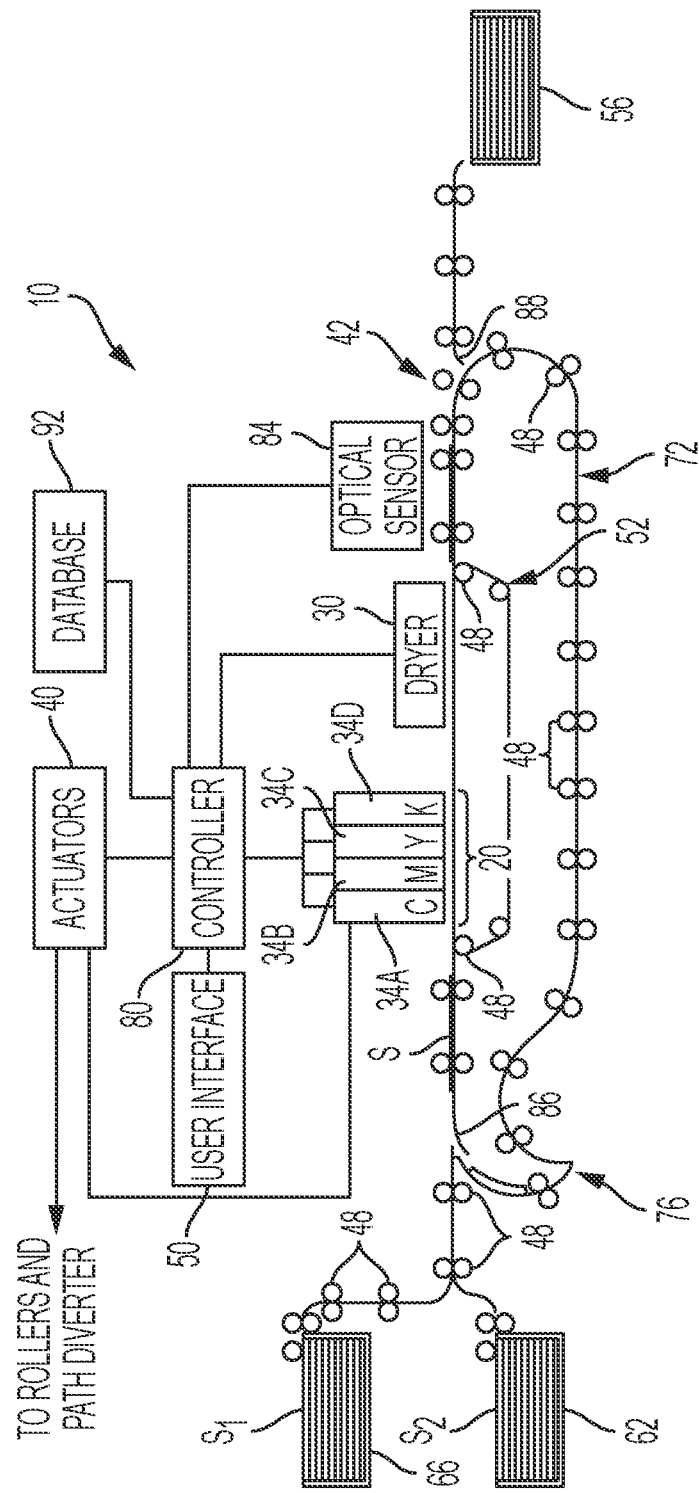
FIG. 1 is a schematic drawing of a high-speed color inkjet printer according to various embodiments.

Reference will now be made in detail to example implementations, illustrated in the accompanying drawings. Wherever possible, the same reference numbers will be used throughout the drawings to refer to the same or like parts. In the following description, reference is made to the accompanying drawings that form a part thereof, and in which is shown by way of illustration specific exemplary embodiments in which the invention may be practiced. These embodiments are described in sufficient detail to enable those skilled in the art to practice the invention and it is to be understood that other embodiments may be utilized and that changes may be made without departing from the scope of the invention. The following description is, therefore, merely exemplary.

Some embodiments determine print-prohibited regions of a media sheet and generate a corresponding mask that includes representations of print-prohibited regions of the particular media sheet type. Such print-prohibited regions may include non-printable regions in the media sheets, such as, by way of non-limiting examples, holes, voids, adhesives, glossy surfaces, and/or plastic windows. Other print-prohibited regions include regions that should not be printed on, such as pre-printed regions of the media sheets. Some embodiments automatically generate the mask by utilizing an optical imager that is integrated with a printer; other embodiments utilize an optical imager that is separate from the printer.

Some embodiments allow for user designation of print-prohibited regions, e.g., by annotating the automatically-generated mask. Such user-designated print-prohibited regions may include regions that will be subject to future processing that is incompatible with prior printing, such as, by way of non-limiting example, areas subject to folds, areas subject to label application, areas subject to glossy surface application, and/or areas subject to die-cutting.

Some embodiments use the automatically-generated, and possibly annotated, mask to generate and store a template corresponding to the media sheet. Such a template may be specific to a particular printer. According to some embodiments, such a template can be used for any of a variety of purposes, including: preventing a printer from depositing ink in print-prohibited regions, generating image content data using image creation software or from a scan, and/or detecting misoriented media sheets at the start of, or during, a print job.

Thus, some embodiments solve the problem of depositing ink in print-prohibited regions (or though such areas, if such areas are holes or voids). Because ink jet printers generally deposit ink throughout the surface of a media sheet, such embodiments are useful for preventing print artifacts and fouled print equipment. Some embodiments solve the problem of misoriented media sheets. Such embodiments may detect misoriented media sheets at the start of a print job using the template, and may detect misoriented media sheets during a print job. These and other features and advantages are shown and described presently in reference to the included figures.

FIG. 1 depicts a prior art high-speed color inkjet printer 10 according to various embodiments. As illustrated, the printer 10 is a printer that directly forms an ink image on a surface of a media sheet stripped from one of the supplies 61, 62 of media sheets $S_1$, $S_2$ and the sheets S are moved through the printer 10 in the print process direction by the controller 80 operating one or more of the actuators 40 that are operatively connected to rollers 48 or to at least one driving roller of conveyor 52 that comprise a portion of the media transport 42 that passes through the print zone 20 of the printer. In some implementations, each printhead module has only one printhead that has a width that corresponds to a width of the widest media in the cross-process direction that can be printed by the printer. In other implementations, the printhead modules have a plurality of printheads with each printhead having a width that is less than a width of the widest media in the cross-process direction that the printer can print, with the printheads arranged in an array of staggered printheads that enables media wider than a single printhead to be printed. Although printer 10 is depicted with only two supplies of media sheets, the printer can be configured with three or more sheet supplies, each containing a different type or size of media.

During a print operation, the printed image passes under an image dryer 30 after the ink image is printed on a sheet S. The image dryer 30 can include an infrared heater, a heated air blower, air returns, or combinations of these components to heat the ink image and at least partially fix an image to the web. An infrared heater applies infrared heat to the printed image on the surface of the web to evaporate water or solvent in the ink. The heated air blower directs heated air using a fan or other pressurized source of air over the ink to supplement the evaporation of the water or solvent from the ink. The air is then collected and evacuated by air returns to reduce the interference of the dryer air flow with other components in the printer.

The printer 10 includes an optical imager 80 after the dryer 30 in the path direction of the media transport 42. As shown in FIG. 1, according to some embodiments, the optical imager may be positioned after the print zone 20 and dryer 30 in the process direction of the media transport. In various other embodiments, the optical imager 80 may be positioned between the print zone 20 and dryer 30, or prior to the print zone 20 in the process direction of the media transport 42. The optical imager 84 can be a charge-coupled device, a digital camera, an array of LEDs and photodetectors, or another device capable of generating image data of a passing surface. According to some embodiments, the optical imager 80 is a high-resolution imager, e.g., with a resolution capable of capturing individual dots printed by a 1200×1200 dpi printer. The optical imager 80 may have a field of view that encompasses an entire media sheet, or at least a width of a media sheet in a process direction as well as at least a portion of a length, or an entire length, of a media sheet in the process direction. The optical imager 80 may have a depth of field sufficient to capture images of a media sheet as it travels through the media transport 42 and experiences fluctuations in its distance from the optical imager 80. The optical imager 80 may be pre-focused so as to capture an image of the media sheet, and/or may be adjustably, or automatically, focused on the media sheet.

In general, the optical imager 84 captures electronic images of media sheets as they pass by for processing to generate a mask as described herein. The optical imager may capture such images of media sheets after they have been printed, prior to their being printed, or as part of a process that does not include printing on a particular media sheet. For example, according to some embodiments, the optical imager 84 may be used to capture images of a media sheet prior to the media sheet type being used for a print job. The image data may be provided in any of a variety of formats, such as a bit map, a JPEG, a JPEG 2000, a GIF, a TIFF, a PS, a PDF, or any other digital image file format.

The optical imager 84 provides image data to the controller 80 in order to generate a mask that represents print-prohibited regions according to various embodiments. Such print-prohibited regions can include, by way of non-limiting example, non-printable areas or areas that should not be printed on, e.g., because they already have been pre-printed. By way of non-limiting example, non-printable areas can include holes through the media sheet, voids (such as cutouts from an edge of the media sheet), adhesives (such as adhesive strips that are covered by a removable backing), glossy surfaces, and/or plastic (such as clear plastic windows in an envelope or other application). The controller 80 can identify and represent such areas in a mask using any, or a combination, of techniques. According to some embodiments, the mask is generated from the image data. According to some embodiments, any area that has a color, hue, saturation, or brightness different from that of the plain media sheet is identified as a print-prohibited region in the mask. For example, pixel thresholding may be used, where each pixel with a color, hue, saturation, or brightness in the image data that differs from (e.g., is greater than or less than) that of a pixel of the plain media sheet by a corresponding threshold amount is identified as print-prohibited. According to some embodiments, areas of a particular color, hue, saturation, or brightness are identified as print-prohibited regions. The latter such techniques are particularly useful for identifying, by way of non-limiting examples, adhesives with a removable backing that has a particular color.

According to some embodiments, after the mask is automatically generated, a user has the opportunity to annotate the mask with additional print-prohibited regions. The user may use the user interface 50 to do so. Any of a variety of techniques may be used to define additional print-prohibited regions. According to some embodiments, the user interface may display the mask. According to some embodiments, the user may add pre-defined shapes representing the additional print-prohibited regions (e.g., squares, rectangles, circles, ovals, triangles, etc.) to the displayed mask through the user interface. According to some embodiments, the user may paint additional print-prohibited regions on the mask using free-hand techniques, e.g., using a mouse or touchscreen. According to some embodiments, in addition to adding additional print-prohibited regions, or in the alternative, the user may also edit the automatically generated print-prohibited regions, e.g., by reducing or enlarging their size, or by changing their shape. According to some embodiments, the user may generate a mask by annotating an initially blank mask; that is, embodiments are not limited to annotating an automatically-generated mask.

According to some embodiments, print prohibited areas are represented by a particular color in the mask, e.g., black, where print-allowed areas are represented by a different color, e.g., white. The mask may be provided in any of a variety of formats, such as a bit map, a JPEG, a JPEG 2000, a GIF, a TIFF, a PS, a PDF, or any other digital image file format.

The controller 80 may generate a template for the media sheet that includes information regarding the media sheet, for example, an identification of the print-prohibited region represented by the mask. The template may be implemented as a data structure that includes the mask as well as additional attributes, such as any, or a combination, of: an identification of the media sheet type (e.g., a name of the media sheet type), a material, a color, a weight, a thickness, a size (e.g., a length and/or width), a grain direction, an orientation, a treatment indication (e.g., inkjet treatment or no inkjet treatment), and/or a coating (e.g., no coating, plain coating, matte coating, or gloss coating). The orientation may indicate how the media sheet is to be positioned with respect to a print process direction, e.g., relative to the length and width of the media sheet and/or relative to any print-prohibited region(s). The orientation information may include an indication of a front and back side of the media sheet. Any of these attributes may be input by an operator at a user interface, e.g., a user interface to the controller 80. Some attributes, such as color, may be pre-populated in the template by the controller by analyzing the image data.

The template may be specific to the particular printer 10. That is, because printers of the same type may differ from each-other in, e.g., the regions that they print in by up to one millimeter in any direction, the template may represent print-prohibited regions relative to the particular printer 10. For example, the mask may depict print-prohibited regions relative to the particular printer's print region.

The template may be stored in, and retrievable from, a persistent memory communicatively coupled to the controller 80. For example, the template may be stored in the database 92. The image capture, mask generation, template generation, and template storage described herein may be initiated and controlled by a user via the user interface 50.

In addition to the processing described above, image data of printed sheets produced by the optical imager 84 can analyzed by the controller 80 to, e.g., detect streakiness in the printed images on the media sheets of a print job. In addition, or in the alternative, sheets that are printed with test pattern images can be inserted at intervals during the print job. These test pattern images can be analyzed by the controller 80 to determine which inkjets, if any, that were operated to eject ink into the test pattern did in fact do so, and if an inkjet did eject an ink drop whether the drop landed at its intended position with an appropriate mass. Any inkjet not ejecting an ink drop it was supposed to eject or ejecting a drop not having the right mass or landing at an errant position is called an inoperative inkjet in this document. The controller can store data identifying the inoperative inkjets in database 92 operatively connected to the controller. These sheets printed with the test patterns are sometimes called run-time missing inkjet (RTMJ) sheets and these sheets are discarded from the output of the print job. A user can operate the user interface 50 to obtain reports displayed on the interface that identify the number of inoperative inkjets and the printheads in which the inoperative inkjets are located.

A duplex path 72 is provided to receive a sheet from the transport system 42 after a substrate has been printed and move it by the rotation of rollers in an opposite direction to the process direction of movement past the printheads. At position 76 in the duplex path 72, the substrate can be turned over so it can merge into the job stream being carried by the media transport system 42. The controller 80 is configured to flip the sheet selectively. That is, the controller 80 can operate actuators to turn the sheet over so the reverse side of the sheet can be printed or it can operate actuators so the sheet is returned to the transport path without turning over the sheet so the printed side of the sheet can be printed again. Movement of pivoting member 88 provides access to the duplex path 72. Rotation of pivoting member 88 is controlled by controller 80 selectively operating an actuator 40 operatively connected to the pivoting member 88. When pivoting member 88 is rotated counterclockwise as shown in FIG. 1, a substrate from media transport 42 is diverted to the duplex path 72. Rotating the pivoting member 88 in the clockwise direction from the diverting position closes access to the duplex path 72 so substrates on the media transport move to the receptacle 56. Another pivoting member 86 is positioned between position 76 in the duplex path 72 and the media transport 42. When controller 80 operates an actuator to rotate pivoting member 86 in the counterclockwise direction, a substrate from the duplex path 72 merges into the job stream on media transport 42. Rotating the pivoting member 86 in the clockwise direction closes the duplex path access to the media transport 42.

As further shown in FIG. 1, the printed media sheets S not diverted to the duplex path 72 are carried by the media transport to the sheet receptacle 56 in which they are be collected. Media sheets diverted to the duplex path 72 are turned over and returned to the transport prior to the printhead modules so the opposite side of the sheet can be imaged and/or printed.

According to some embodiments, the optical imager 84 captures image data of the back of the media sheet, e.g., using the duplex path 72. According to such embodiments, the controller 80 may generate an additional mask for the back of the media sheet from such image data. Further according to such embodiments, the controller 80 may include the separate mask in the template associated with the media sheet. Thus, the template may include a first mask representing a print-prohibited region on the front of the media sheet and a second mask representing a print-prohibited region on the back of the media sheet. Either or both such masks may be user-annotated as described herein. The template may further include data representing other attributes for the back of the media sheet, including for any of the attribute types described above for the front of the media sheet. Thus, the template may include different information for the same attribute relative to the same media sheet; by way of non-limiting example, the front side may be coated, and the back side may be uncoated, or coated with a different coating.

Operation and control of the various subsystems, components and functions of the machine or printer 10 are performed with the aid of the controller 80 or electronic subsystem (ESS). The ESS or controller 80 is communicatively connected to the components of the printhead modules 34A-34D (and thus the printheads), the actuators 40, and the dryer 30. The ESS or controller 80, for example, can be a self-contained computer having a central processor unit (CPU) with electronic data storage, and a display or user interface (UI) 50. The user interface 50 may include a touch screen, a physical keyboard, a mouse, and/or any other interface mechanism. The ESS or controller 80, for example, includes a sensor input and control circuit as well as a pixel placement and control circuit. In addition, the CPU reads, captures, prepares, and manages the image data flow between image input sources, such as a scanning system or an online or a work station connection (not shown), and the printhead modules 34A-34D. As such, the ESS or controller 80 is the main multi-tasking processor for operating and controlling all of the other machine subsystems and functions, including the printing process.

The controller 80 can be implemented with general or specialized programmable processors that execute programmed instructions. The instructions and data required to perform the programmed functions can be stored in memory associated with the processors or controllers. The processors, their memories, and interface circuitry configure the controllers to perform the operations described below. These components can be provided on a printed circuit card or provided as a circuit in an application specific integrated circuit (ASIC). Each of the circuits can be implemented with a separate processor or multiple circuits can be implemented on the same processor. Alternatively, the circuits can be implemented with discrete components or circuits provided in very large scale integrated (VLSI) circuits. Also, the circuits described herein can be implemented with a combination of processors, ASICs, discrete components, or VLSI circuits.

In a print job, image content data for an image to be printed are sent to the controller 80 from either a scanning system or an online or work station connection for processing and generation of the printhead control signals output to the printhead modules 34A-34D. Along with the image content data, the controller 80 may receive print job parameters that identify the media weight, media dimensions, print speed, media type, ink area coverage to be produced on each side of each sheet, location of the image to be produced on each side of each sheet, media color, media fiber orientation for fibrous media, print zone temperature and humidity, media moisture content, and media manufacturer. Some or all of the print job parameters may be provided to the controller 80 in a template, as described herein. Print job parameters can include non-image content data for a print job, and image content data can include digital data that identifies an ink image to be printed on a media sheet.

While FIG. 1 shows the printed sheets as being collected in the sheet receptacle, they can be directed to other processing stations (not shown) that perform tasks such as punching, folding, collating, binding, and stapling of the media sheets. Such other processing stations may be situated on or after pivoting member 88, and prior to sheet receptacle 56.

Although the printer 10 is depicted as a color inkjet printer, embodiments are note so limited. Embodiments may be utilized with toner printers, laser printers, or any other digital printer. Embodiments may be advantageous to toner printers, for example, to prevent toner from being deposited through holes or voids in media sheet and fouling equipment or causing print artifacts.

Although the printer 10 is shown as including a single optical imager 84, embodiments are not so limited. Some embodiments include two optical imagers, which capture images of the front and back of the media sheets without use of a duplex path, such as duplex path 72. Such embodiments may capture such front and back images sequentially of simultaneously. Such embodiments are particularly useful for continuous printing using rolls of media, described presently.

Although the printer 10 is described as printing on cut-sheet media, embodiments are not so limited. Some embodiments may be utilized with continuous strips of media that are later cut to individual items, such as sheets, cards, envelopes, mailers, etc., subsequent to printing. For example, embodiments may be used with offset web printing. According to some embodiments, a mask may be generated for an individual item of a continuous sheet. Further, for such embodiments, the template may include cutting information, indicating where the continuous strip of media is to be cut. Further, the print-prohibited regions may include lead edge and training edge margins, which may be specified by user annotation. Thus, the mask may represent intra-sheet print-prohibited regions.

Although the optical imager 84 is shown in FIG. 1 as being integrated with the printer 10, embodiments are not so limited. Some embodiment may include an optical imager that is physically separate from the printer. According to such embodiments, a media transport of the optical imager may be coupled to a media transport of the printer, so that media sheets may be automatically transferred from the optical imager to the printer or vice versa.

Figure 2:
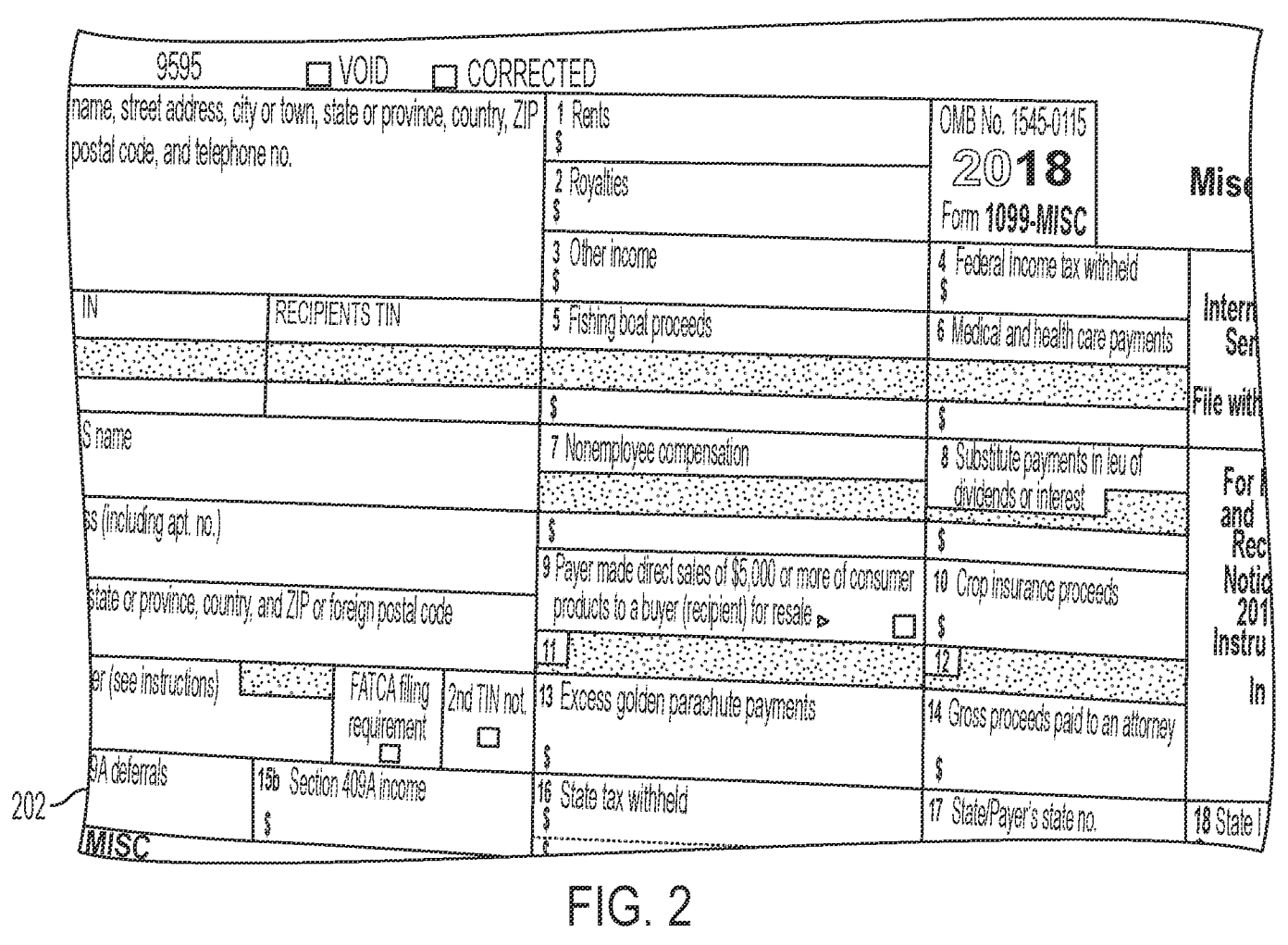
Figure 2:
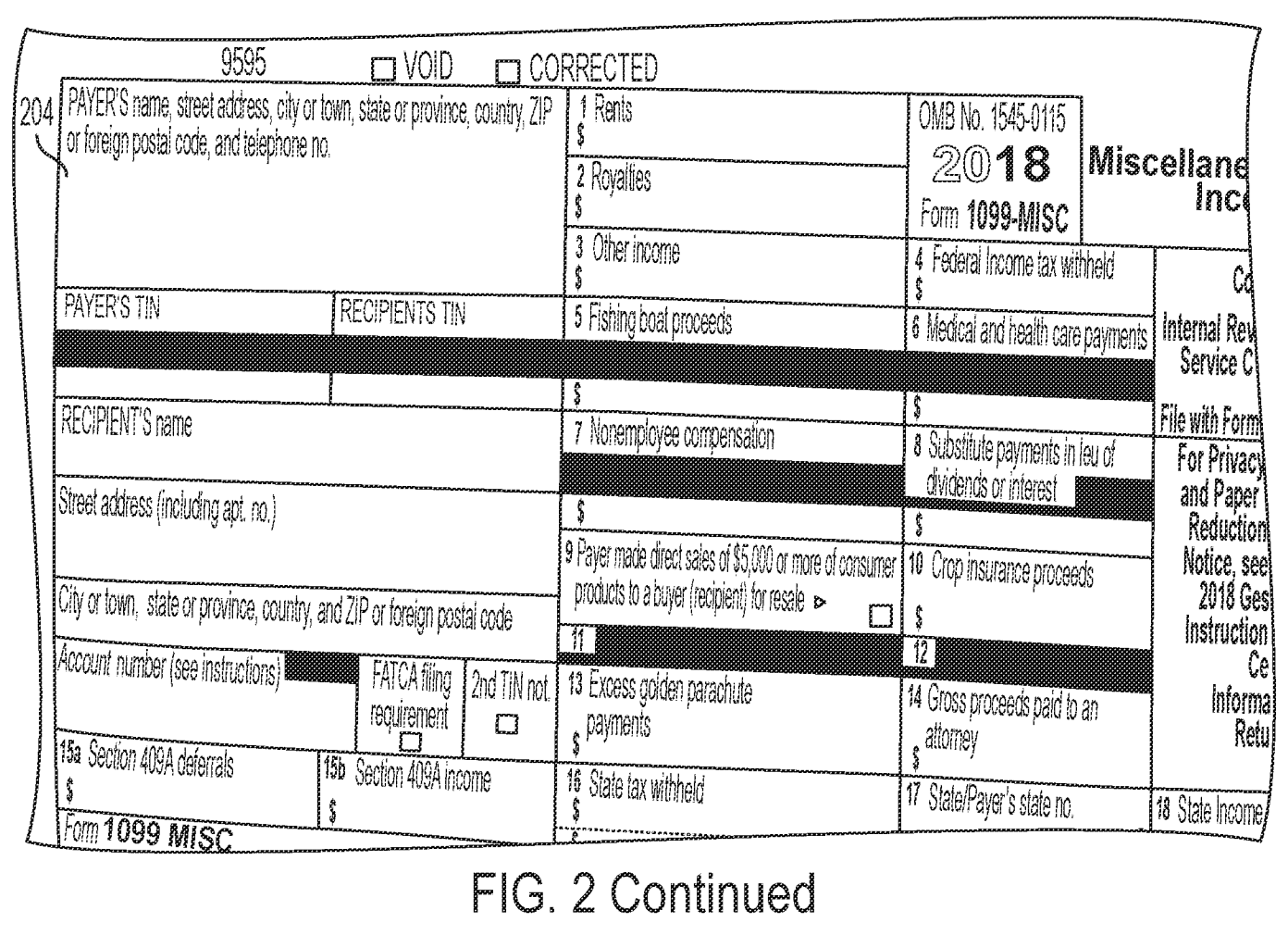

FIG. 2 depicts a media sheet 202 with pre-printed print-prohibited regions and an associated mask 204 according to various embodiments. The mask 204 may be produced by a system such as that shown and described in reference to FIG. 1. For example, the mask 204 generated automatically by detecting the pre-printed regions in the image data obtained by the optical imager 84. Note that the pre-printed regions of the media sheet 202 may be printed in any color and shade, whereas the mask 204 may represent such regions using one of two values, e.g., print-prohibited regions in black and print-available regions in white, as shown in the mask 204 of FIG. 2. According to some embodiment, regions of the media sheet 202 that are pre-printed with sharing, or a dense pattern such as stippling, are designated as print-prohibited and depicted as solidly, e.g., black in the mask 204.

Figure 3:
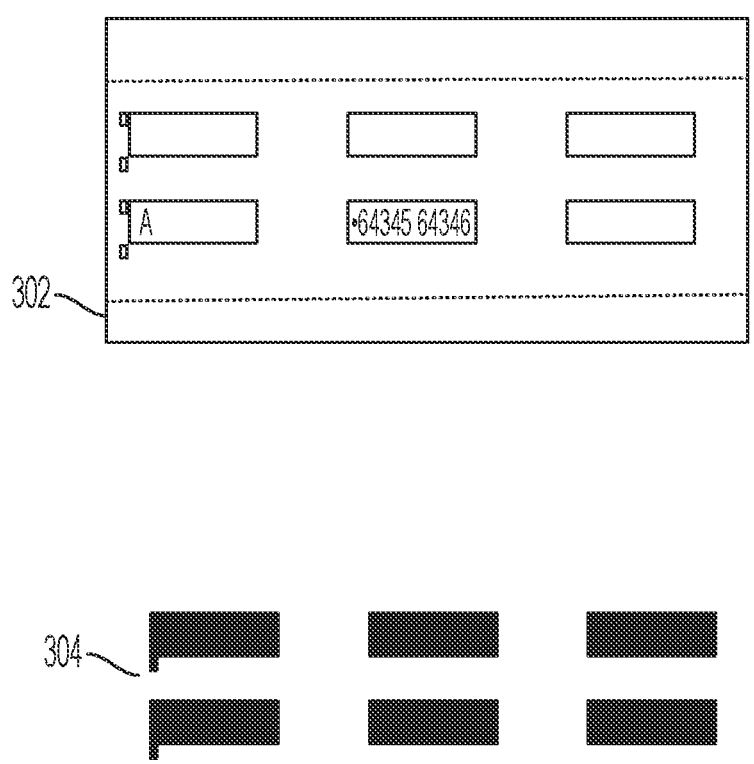
FIG. 3 depicts a media sheet with adhesive print-prohibited regions and an associated mask according to various embodiments.

FIG. 3 depicts a media sheet 302 with adhesive print-prohibited regions and an associated mask 304 according to various embodiments. The mask 304 may be produced by a system such as that shown and described in reference to FIG. 1. For example, the mask 304 generated automatically by detecting the adhesive regions in the image data obtained by the optical imager 84. The controller 80 may identify the adhesive regions by detecting a particular color, hue, and/or brightness in the optical image, for example. For example, pixel thresholding, as described herein, may be used. As shown in FIG. 3, the mask 304 depicts adhesive print-prohibited regions as black, and print-permissible regions as white; however, other representations may be used in the alternative.

According to some embodiments, the mask is used to prevent ink from being deposited on the represented print-prohibited regions of media sheets during a print job. Some such embodiments are superior to prior art techniques that manually prevent ink from being deposited on entire process-direction swaths of media sheets, because the print-prohibited regions can be customized to prevent printing on any discrete portion of a media sheet, as shown in FIG. 3 and as shown in FIG. 4, described presently.

Figure 4:
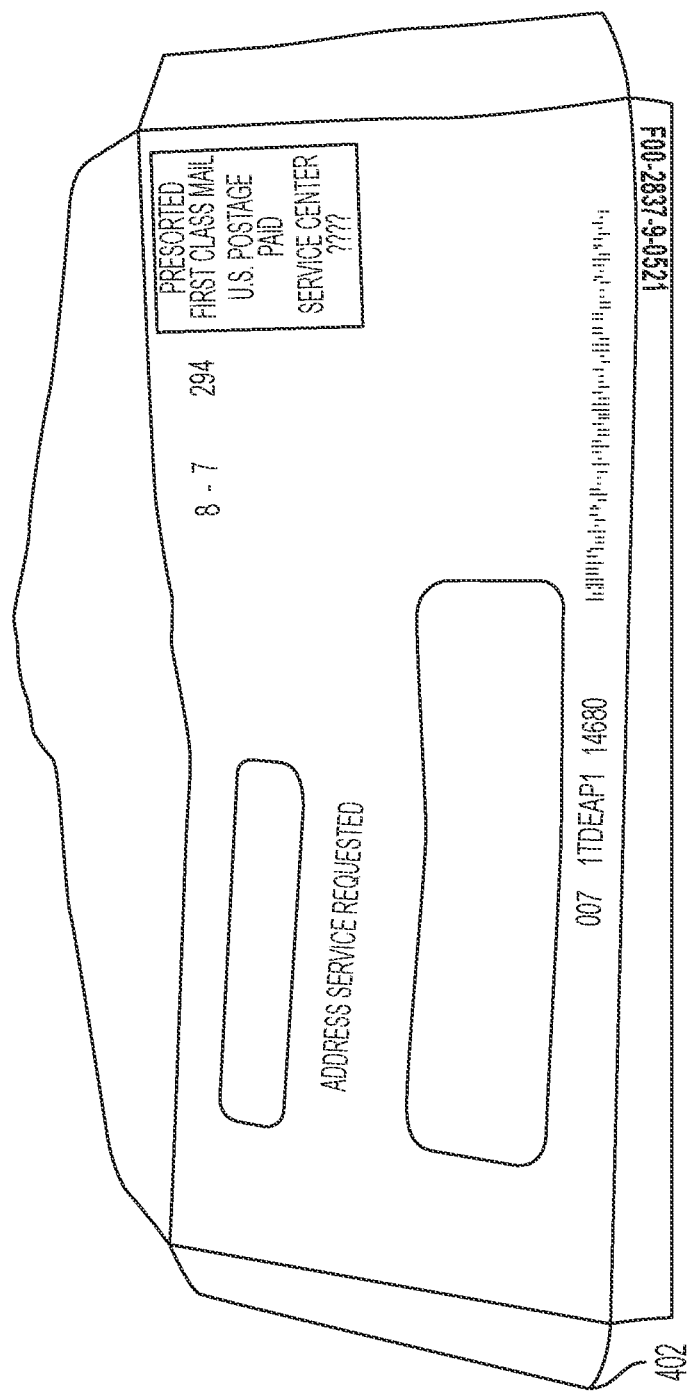
FIG. 4 depicts a media sheet with hole and plastic window print-prohibited regions and an associated mask according to various embodiments.
Figure 4:
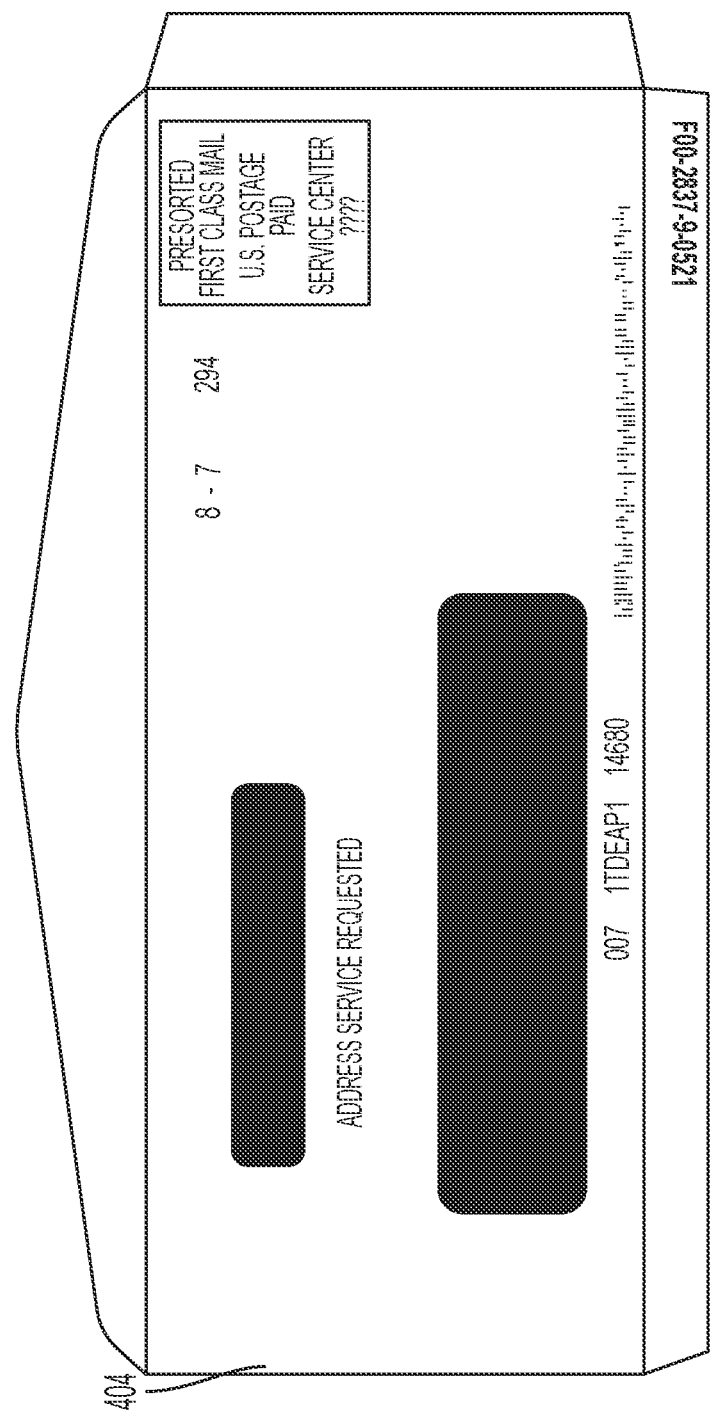

FIG. 4 depicts a media sheet with hole and plastic window print-prohibited regions and an associated mask according to various embodiments. The mask 404 may be produced by a system such as that shown and described in reference to FIG. 1. For example, the mask 204 generated automatically by detecting the hole and plastic window regions in the image data obtained by the optical imager 84. The controller 80 may identify the hole and plastic window regions by detecting a particular color, hue, and/or brightness in the optical image, for example. For example, some embodiments may include a backstop with a particular color behind the media sheet as it passes the optical imager 84. Any holes, voids, or clear plastic windows will show the particular color in the corresponding optical image. Pixel thresholding, as described herein, may be used to detect such a color. The mask 404 that depicts hole and plastic window print-prohibited regions as black, and print-permissible regions as white is non-limiting; other representations may be used in the alternative.

Figure 5:
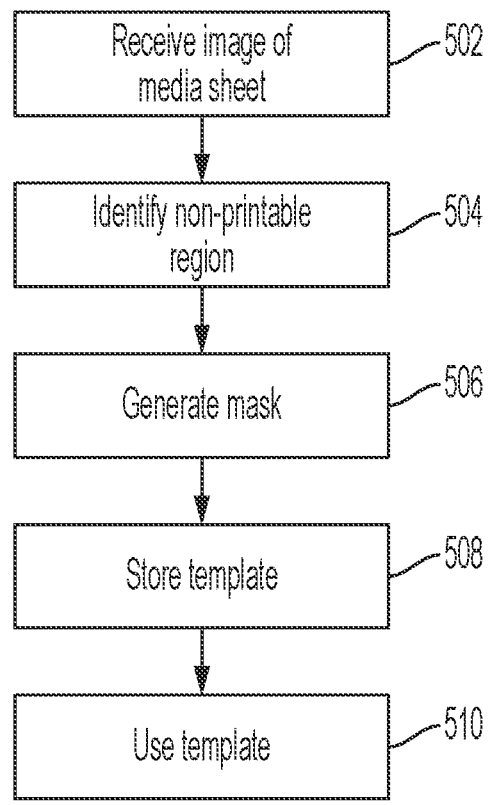
FIG. 5 is a flow diagram of a method for operating a digital printer according to various embodiments.

FIG. 5 is a flow diagram of a method 500 for operating a digital printer according to various embodiments. The method 500 may be implemented by a system that includes or is used with a printer such as the printer 10 as shown and described herein in reference to FIG. 1. The printer may include a media transport, such as the media transport 42, and an electronic imager, such as the optical imager 84, disposed in a path of the media transport. The electronic imager may be communicatively coupled to an electronic processor to provide electronic image data thereto. The system that implements the method 500 includes an electronic persistent memory communicatively coupled to the electronic processor, where the electronic persistent memory stores instructions that, when executed by the electronic processor, causes the electronic processor to implement the method 500 as described herein.

At 502, the method 500 receives, e.g., by the electronic processor, an electronic image of a media sheet obtained by the electronic imager. The actions of this block may be as shown and described herein in reference to the optical imager 84 of FIG. 1. The actions of 502 (as well as the actions of those of 504. 506, and 508) may occur before, or as an initial part of, a print job, according to various usages, described in detail below in reference to block 510.

At 504, the method 500 identifies, from the electronic image of the media sheet, a print-prohibited region of the media sheet. The actions of this block may be as shown and described herein in reference to FIGS. 1-4, e.g., through the use of color, hue, or brightness detection. One or multiple print-prohibited regions may be identified.

At 506, the method 500 generates a mask representing the print-prohibited region of the media sheet. The actions of this block may be as shown and described herein in reference to FIGS. 1-4, e.g., through the use of pixel thresholding.

At 508, the method 500 electronically stores in electronic persistent memory, in association with an identification of the media sheet, a template that includes information regarding the media sheet. The template may be as described herein in reference to FIG. 1, and include an identification of the print-prohibited region represented by the mask. For example, the template may identify the print-prohibited regions identified by the mask by including a copy of the mask in the template.

At 510, the method 500 uses the template. Any of a variety of uses for the template are possible. The actions of 510 may occur before, at the start of, or during a print job. The template usages described herein may be initiated and controlled by a user via a user interface such as the user interface 50 as shown and described herein in reference to FIG. 1.

As a first example usage, the method 500 may use the template during a print job to prevent printing on a print-prohibited portion of a media sheet of the type identified by the template. Prior to commencement of the print job, a media sheet type of the print job and the template may be provided to the printer, as well as image content data representing the image content to be printed. The media sheet type of the print job may be identified to the printer by a user, e.g., via the user interface 50. The template may be identified to the printer by a user and provided to the printer by retrieval from a persistent memory, e.g., the database 50. The printer may extract the mask from the template. The printer may execute the print job by printing image content corresponding to the image content data onto media sheets of the type identified in the template.

Alternately, according to some embodiments, as an initial part of a print job, a media sheet may be processed by the printer to automatically generate a mask as described herein, and any print-prohibited regions represented in the mask may be used to prevent printing in corresponding regions of the media sheets during the print job. Thus, according to some embodiments, identification of print-prohibited regions can occur as part of a print process, and the identified regions can be used to prevent ink deposition during the print process.

In general, according to the first example usage, during printing, the printer may be prevented from depositing ink in print-prohibited regions as represented in the mask, even if the image content data indicates otherwise. For example, the controller, such as controller 80, may shut off the ink jets when positioned in locations of media sheets that correspond to the print-prohibited regions represented by the mask. If the mask in the template includes representations of print-prohibited regions on both sides of the media sheet, the first example usage may prevent ink from being deposited in the print-prohibited regions on both sides during a duplex print job.

As a second example usage, the template may be used at the start of, or during, a print job, to detect and act on misoriented media sheets. According to such embodiments, the template includes media sheet orientation information, indicating the proper orientation of the media sheets relative to the print process direction. According to some embodiments, at the start of a print job, one or more initial media sheets are passed through the printer in the process direction (e.g., along the media transport 42) with or without printing, and an image is captured, e.g., by the optical imager 84. The captured image is analyzed with respect to the orientation information to determine whether the media sheet is properly oriented for the print job. According to various embodiments, the action of image capture and proper orientation determination is made sporadically (e.g., randomly), periodically (e.g., every n sheets, where n can be any number from 2 to 100), or continuously (i.e., for every media sheet) throughout the print job. If at any point a misoriented media sheet is detected, an alert may be sent to the user, e.g., via the user interface 50. Alternately, or in addition, the print job may be halted to permit the user to reposition any further misoriented media sheets, e.g., in the media sheet supplies 61, 62.

As a third example usage, prior to a print job, the template may be provided to a graphic design process. For example, the database 52 may be communicatively coupled to a workstation computer that has installed thereon graphic design and/or scanning software. The template may be used to prepare image content data for a later print job using such graphic design and/or scanning software. For example, a graphic designer may prepare image content data in a workspace defined in part by the mask, such that the image content data does not intersect any print-prohibited region. The image content data can then later be used for a print job, and the print job may include usage of the corresponding template, e.g., in accordance with the first example usage of the template described herein. If the mask in the template includes representations of print-prohibited regions on both sides of the media sheet, the third example usage may include preparing print content data for use on both sides of the media sheets during a duplex print job.

Certain embodiments can be performed using a computer program or set of programs. The computer programs can exist in a variety of forms both active and inactive. For example, the computer programs can exist as software program(s) comprised of program instructions in source code, object code, executable code or other formats; firmware program(s), or hardware description language (HDL) files. Any of the above can be embodied on a transitory or non-transitory computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method can be performed in a different order than illustrated or simultaneously. Those skilled in the art will recognize that these and other variations are possible within the spirit and scope as defined in the following claims and their equivalents.

What is claimed is:

1. A system for operating a digital printer, the system comprising:
   a media transport;
   an electronic imager disposed in a path of the media transport;
   an electronic processor communicatively coupled to an electronic output of the electronic imager; and
   an electronic persistent memory communicatively coupled to the electronic processor, the electronic persistent memory comprising instructions that, when executed by the electronic processor, causes the electronic processor to perform actions comprising:
      receiving an electronic image of a media sheet obtained by the electronic imager;
      identifying, from the electronic image of the media sheet, a print-prohibited region of the media sheet;
      generating a mask representing the print-prohibited region of the media sheet;

electronically storing in electronic persistent memory, in association with an identification of a type of the media sheet, a template comprising information regarding the media sheet type, wherein the template comprises an identification of the print-prohibited region represented by the mask, and wherein the template further comprises media sheet orientation information; and comparing, after the receiving, the identifying, the generating, and the electronically storing, and during a print job of the digital printer, an electronic image of a media sheet obtained by the electronic imager during the print job to the media sheet orientation information.

2. The system of claim 1, wherein the actions further comprise:

providing the template to the printer;

executing, by the printer, a print job, wherein the executing the print job comprises printing image content on a media sheet of the type identified by the template; and preventing the printer from printing on a print-prohibited region represented by the mask.

3. The system of claim 1, further comprising the digital printer, wherein a media pathway of the digital printer comprises the media transport.

4. The system of claim 1, wherein the actions further comprise providing an alert based on the comparing indicating a media sheet misorientation.

5. The system of claim 3, wherein the digital printer comprises an inkjet printer.

6. The system of claim 1, wherein the media transport comprises a duplex media transport, and wherein the template comprises identifications of print-prohibited regions on both sides of the media sheet.

7. The system of claim 1, wherein the generating the mask comprises identifying at least one of: a glue region, a media sheet hole, a media sheet void, a glossy region, or a preprinted region.

8. The system of claim 1, further comprising a user interface, wherein the actions further comprise annotating the mask with an additional print-prohibited region based on user input received at the user interface.

9. The system of claim 8, wherein the additional print-prohibited region comprises a region subject to: a future gloss coat, a future die-cut, a future fold, or a future label application.

10. The system of claim 1, wherein the mask representing the print-prohibited region represents the print-prohibited region in an area consisting of less than a process-direction width of the media sheet.

11. The system of claim 1, wherein the actions further comprise, prior to a print job, providing the template to a graphic design process.

12. The system of claim 1, wherein the template comprises print information regarding a particular printer.

13. A method of operating a digital printer comprising a media transport and an electronic imager disposed in a path of the media transport, the method comprising:

receiving an electronic image of a media sheet obtained by the electronic imager;

identifying, from the electronic image of the media sheet, a print-prohibited region of the media sheet;

generating a mask representing the print-prohibited region of the media sheet;

electronically storing in electronic persistent memory, in association with an identification of a type of the media sheet, a template comprising information regarding the media sheet type, wherein the template comprises an identification of the print-prohibited region represented by the mask, and wherein the template further comprises media sheet orientation information; and comparing, after the receiving, the identifying, the generating, and the electronically storing, and during a print job of the digital printer, an electronic image of a media sheet obtained by the electronic imager during the print job to the media sheet orientation information.

14. The method of claim 13, further comprising:

providing the template to the printer;

executing, by the printer, a print job, wherein the executing the print job comprises printing image content on a media sheet of the type identified by the template; and preventing the printer from printing on a print-prohibited region represented by the mask.

15. The method of claim 13, wherein a media pathway of the digital printer comprises the media transport.

16. The method of claim 13, further comprising providing an alert based on the comparing indicating a media sheet misorientation.

17. The method of claim 15, wherein the digital printer comprises an inkjet printer.

18. The method of claim 13, wherein the media transport comprises a duplex media transport, and wherein the template comprises identifications of print-prohibited regions on both sides of the media sheet.

19. The method of claim 13, wherein the generating the mask comprises identifying at least one of: a glue region, a media sheet hole, a media sheet void, a glossy region, or a preprinted region.

20. The method of claim 13, further comprising annotating the mask with an additional print-prohibited region based on user input received at a user interface.

21. The method of claim 20, wherein the additional print-prohibited region comprises a region subject to: a future gloss coat, a future die-cut, a future fold, or a future label application.

22. The method of claim 13, wherein the mask representing the print-prohibited region represents the print-prohibited region in an area consisting of less than a process-direction width of the media sheet.

23. The method of claim 13, further comprising, prior to a print job, providing the template to a graphic design process.

24. The method of claim 13, wherein the template comprises print information regarding a particular printer.

* * * * *